(12) United States Patent
Haesloop et al.

(10) Patent No.: US 7,691,018 B2
(45) Date of Patent: Apr. 6, 2010

(54) WEDGE-DAMPED BLADE TENSIONER

(75) Inventors: J. Christian Haesloop, Ithaca, NY (US); Sam A. Kuznets, Burdett, NY (US)

(73) Assignee: BorgWarner, Inc., Auburn Hills, MI (US)

( * ) Notice: Subject to any disclaimer, the term of this patent is extended or adjusted under 35 U.S.C. 154(b) by 1026 days.

(21) Appl. No.: 11/097,748

(22) Filed: Apr. 1, 2005

(65) Prior Publication Data

US 2006/0223661 A1 Oct. 5, 2006

(51) Int. Cl.
*F16H 7/08* (2006.01)
*F16H 7/18* (2006.01)

(52) U.S. Cl. .................... 474/111; 474/140

(58) Field of Classification Search ............ 474/111, 474/140; 192/107 M
See application file for complete search history.

(56) References Cited

U.S. PATENT DOCUMENTS

| | | | |
|---|---|---|---|
| 3,426,606 A | 2/1969 | Hopkins | |
| 4,291,416 A | 9/1981 | Hoeptner, III | 474/138 |
| 4,457,741 A | 7/1984 | Hoeptner, III | 474/138 |
| 4,921,472 A | 5/1990 | Young | 474/111 |
| 5,055,088 A | 10/1991 | Cradduck et al. | 474/111 |
| 5,083,650 A * | 1/1992 | Seiz et al. | 192/107 M |
| 5,711,732 A | 1/1998 | Ferenc et al. | 474/111 |
| 5,797,818 A | 8/1998 | Young | 474/111 |
| 5,951,423 A | 9/1999 | Simpson | 474/109 |
| 5,984,815 A | 11/1999 | Baddaria | 474/111 |
| 6,361,459 B1 | 3/2002 | Serkh et al. | 474/133 |
| 6,623,391 B2 * | 9/2003 | Young et al. | 474/111 |
| 6,767,302 B2 | 7/2004 | Seungpyo | 474/109 |
| 2002/0069539 A1 | 6/2002 | Tada | |
| 2002/0094894 A1 | 7/2002 | Poiret et al. | 474/101 |
| 2002/0142872 A1* | 10/2002 | Tada | 474/111 |
| 2003/0125144 A1* | 7/2003 | Horikawa et al. | 474/111 |
| 2003/0186764 A1 | 10/2003 | Yoshida et al. | 474/109 |
| 2003/0236144 A1 | 12/2003 | Seungpyo | 474/110 |
| 2004/0005953 A1 | 1/2004 | Yonezawa et al. | |
| 2004/0029664 A1 | 2/2004 | Yoshida et al. | 474/109 |
| 2004/0029665 A1 | 2/2004 | Yoshida et al. | 474/109 |
| 2004/0127316 A1 | 7/2004 | Hashimoto et al. | 474/109 |

FOREIGN PATENT DOCUMENTS

| | | |
|---|---|---|
| EP | 1323949 | 7/2003 |
| EP | 1338827 | 8/2003 |

(Continued)

*Primary Examiner*—Robert A Siconolfi
*Assistant Examiner*—Robert T Reese
(74) *Attorney, Agent, or Firm*—Brown & Michaels, PC (57) ABSTRACT

A blade tensioner system for a chain that imparts tension to a chain that drivingly connects to a driven shaft to a drive shaft in an engine. The blade tensioner comprises a blade shoe and mating block. The blade shoe has an arcuately curved chain sliding face, a proximal end portion, and a distal end portion having a pair of tapered sides joined by a bottom and at an angle. The mating block has a channel with a pair of tapered sides joined by a bottom and at a second angle for receiving the distal end portion. When load on the chain increases, the tapered sides of the distal end portion and the bottom contact and wedge with the tapered sides of the channel of the mating block, damping chain vibration.

32 Claims, 5 Drawing Sheets

FOREIGN PATENT DOCUMENTS

| | | |
|---|---|---|
| EP | 1452774 | 9/2004 |
| GB | 1077715 | 8/1967 |
| JP | 2003322226 | 11/2003 |
| JP | 2004028346 | 1/2004 |
| JP | 2005325855 | 11/2005 |

* cited by examiner

WEDGE-DAMPED BLADE TENSIONER

BACKGROUND OF THE INVENTION

1. Field of the Invention

The invention pertains to the field of chain tensioners. More particularly, the invention pertains to a blade tensioner with a distal end for damped wedging interaction with a complementary stationary block.

2. Description of Related Art

Blade tensioners are well-known in the prior art. A blade-type tensioner is used to impart tension on a chain. A blade tensioner generally includes a plastic blade shoe with an arcuately curved chain-sliding face, a plurality of leaf spring-shaped blade springs provided opposite the chain-sliding face, and a metal base that swingably supports a proximal end portion of the blade shoe and slidably supports a distal end portion of the blade shoe. During operation, a chain slides and travels along the chain-sliding surface of the blade shoe and a resilient force due to the elastic deformation of the blade shoe and the blade spring is applied to the chain by the blade shoe and proper chain tension is maintained. Different types of slidable supports for the distal end have been used in blade tensioners, but they do not dampen chain vibrations sufficiently during chain tensioning.

A wedging effect has been used in mechanical and hydraulic tensioners to dampen chain vibrations. In U.S. Pat. No. 4,291,416, "CHAIN TENSIONER", issued to Hoeptner III on Sep. 22, 1981, the mechanical chain tensioner has a wedgable means co-acting with a plunger to block its retraction. In U.S. Pat. No. 5,951,423, "MECHANICAL FRICTION TENSIONER", issued to Simpson on Sep. 14, 1999, the mechanical tensioner has a wedge-shaped plunger, and wedge-shaped blocks are pushed toward the plunger by springs to provide damping. In U.S. Pat. No. 6,361,459, "TENSIONER", issued to Serkh et al. on Mar. 26, 2002, the mechanical belt tensioner dampens based on the sliding action of mutually-opposed wedges. In U.S. Pat. No. 6,767,302, "HYDRAULIC TENSIONER", issued to Seungpyo on Jul. 27, 2004, the hydraulic tensioner uses a wedging effect to prevent the plunger from moving backwards. In U.S. Publication No. 2002/0094894, "TENSIONER FOR A CHAIN OR BELT", by Poiret et al., the hydraulic tensioner uses wedging to inhibit further inward movement of the plunger during tensioning. In U.S. Publication No. 2003/0186764, "CHAIN TENSIONER", by Yoshida et al., the hydraulic tensioner has a pair of wedge-shaped cams received in tapered recesses.

Mechanical and hydraulic tensioners are considerably more expensive and complicated than blade tensioners, and there are numerous applications, in which a blade tensioner is preferably used. There is a need in the art for a blade tensioner with better damping of chain vibrations during chain tensioning.

SUMMARY OF THE INVENTION

A blade tensioner system for a chain that imparts tension to a chain that drivingly connects a driven shaft to a drive shaft in an engine. The blade tensioner comprises a blade shoe and mating block. The blade shoe has an arcuately curved chain sliding face, a proximal end portion, and a distal end portion having a pair of tapered sides joined by a bottom and arranged at a distal end angle. The mating block has a channel with a pair of tapered sides joined by a bottom and arranged at a mating angle for receiving the distal end portion. When load on the chain increases, the tapered sides of the distal end portion contact and wedge with the tapered sides of the channel of the mating block, damping chain vibration.

A method of damping chain vibrations during tensioning of a chain is also disclosed. The first step is to provide a blade tensioner comprising a blade shoe having an arcuately curved chain sliding face, a proximal end portion, and a distal end portion having a pair of tapered sides joined by a bottom and arranged at a distal end angle. The next step is to provide a mating block stationary with respect to the chain comprising a mating block having a channel with a pair of tapered sides joined by a bottom and arranged at a mating angle for receiving the distal end portion. The third step is to arrange the blade tensioner and the mating block, such that when load on the chain increases, the tapered sides of the distal end portion contact and wedge with the tapered sides of the channel of the mating block, damping chain vibrations.

In one embodiment, the pair of tapered sides of the distal end portion of the blade shoe, joined by a bottom, and arranged at a distal end angle may be straight or planar and wedge with a channel in the mating block that also has straight or planar sides. The wedging of the distal end portion with the mating block damps chain vibrations.

In another embodiment, the pair of tapered sides of the distal end portion of the blade shoe, joined by a bottom, and arranged at a distal end angle may be convexly curved or rounded and wedge with a channel in the mating block having straight or planar sides. The wedging of the distal end portion with the mating block damps chain vibrations.

Alternatively, the pair of tapered sides of the distal end portion of the blade shoe, joined by a bottom, and arranged at a distal end angle may be straight or planar and wedge with a channel in the mating block having convexly curved sides. The wedging of the distal end portion with the mating block damps chain vibrations.

In another embodiment, the pair of tapered sides of the distal end portion of the blade shoe, joined by a bottom, and arranged at a distal end angle may be straight or planar and wedge with a channel in the mating block having sides arranged at a compound angle, resulting in two different distances or widths between the tapered sides of the mating block. At least one portion of the channel has a greater width or distance between the tapered sides and at least another portion of the channel has a smaller width or distance between the tapered sides of the channel. The wedging of the distal end portion with the mating block damps chain vibrations.

DETAILED DESCRIPTION OF THE INVENTION

In an automotive engine, blade tensioners have been used to impart a tensioning force to an engine timing chain or a drive chain for an auxiliary component, such as an oil pump and the like. Blade tensioner usually consist of a blade shoe having an arcuately curved chain-sliding surface and a leaf-spring-shaped blade spring provided on the opposite side of the chain-sliding surface of the blade shoe to apply a spring force to the blade shoe with the proximal end portion of the blade shoe being rotatably supported around a supporting shaft inserted thereinto. In the prior art, the distal end portion of the blade shoe is slidably supported on a supporting surface provided discretely from the blade shoe.

Figure 1:
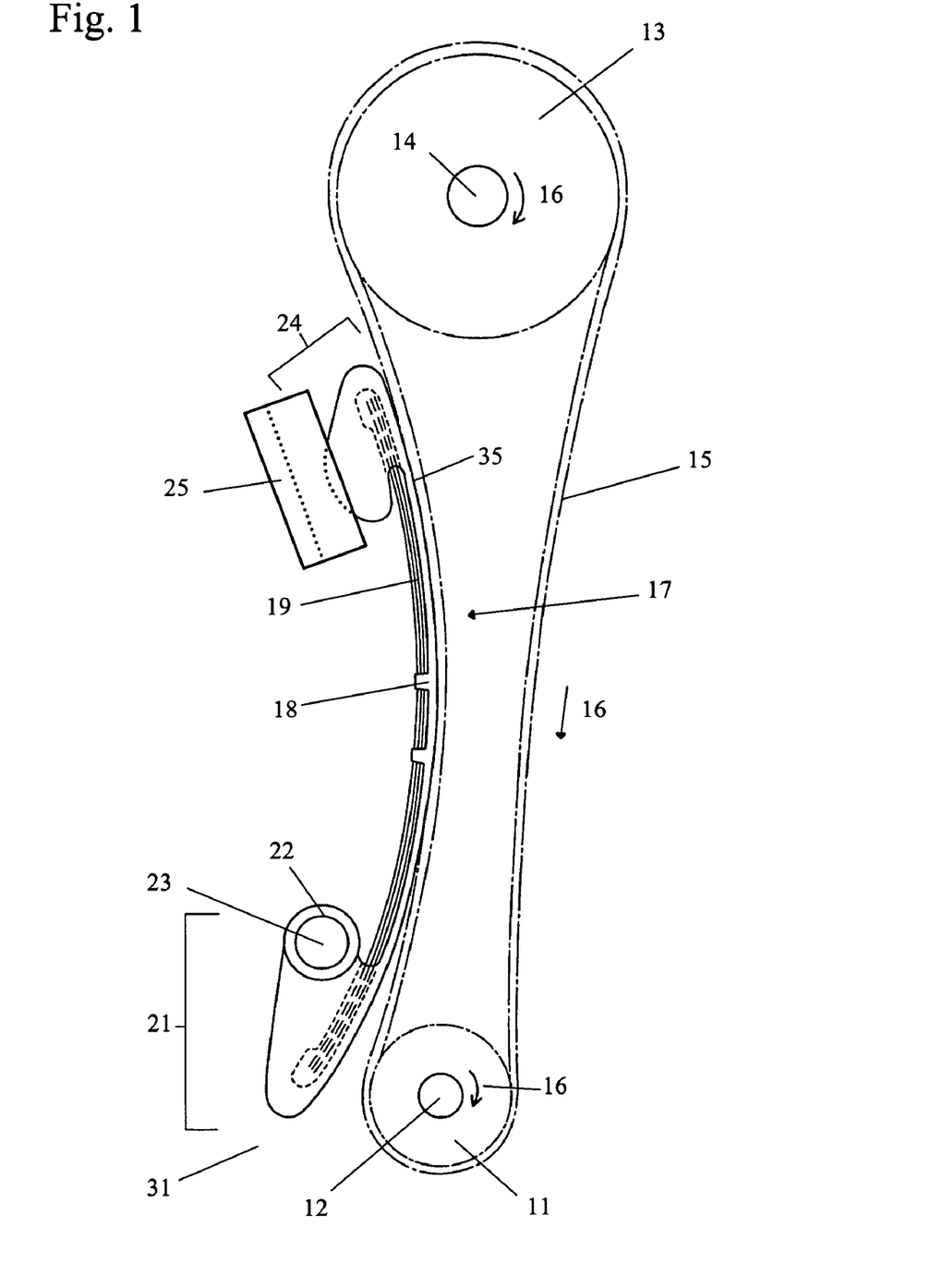
FIG. 1 shows a blade tensioner of the present invention contacting a chain.

FIG. 1 shows an engine camshaft timing system incorporating a blade-type tensioner according to an embodiment of the present invention. The camshaft timing system includes a crank sprocket 11 mounted onto a crankshaft or drive shaft 12, a cam sprocket 13 mounted onto a camshaft or driven shaft 14, and a timing chain 15 wrapped around these sprockets 11, 13 to transmit power from the crankshaft 12 to the camshaft 14. As indicated by the arrows 16 in the figure, the sprockets, shafts, and chain are moving in a clockwise direction. On the slack side of the timing chain, a blade-type tensioner 17 is provided. The blade tensioner 17 includes an arcuately curved, plastic blade shoe 18 with a proximal end portion 21, a distal sliding end portion 24 which is preferably V-shaped, and at least one leaf-shaped blade spring 19 or a plurality of blade springs laminated on the back side of the chain sliding surface 35 to impart tension to the chain 15. The chain sliding face 35 may have guides 41 to aid in maintaining the chain 15 on the chain sliding surface 35. The proximal end portion 21 of the blade shoe 18 has a pivot hole 22 into which a steel pivot pin 23 is inserted. The tensioner is preferably mounted on a stationary aluminum die cast bracket with the steel pivot pin preferably press fitted into an interference hole formed in the bracket (not shown), making the blade shoe 18 pivotable around the pivot pin 23. The distal end portion 24 of the blade shoe 18 is V-shaped and tapers away from the chain-sliding surface 35. The V-shaped distal end may be received by corresponding V-shaped stationary mating block 25.

During operation of the chain, the blade shoe 18 deflects or pivots around the pivot pin 23 of the proximal end portion 21 of the shoe 18 in reaction to chain normal forces. The deflection causes the V-shaped distal end portion 24 of the shoe to wedge or mate with the V-shaped stationary mating block 25.

Figure 2:
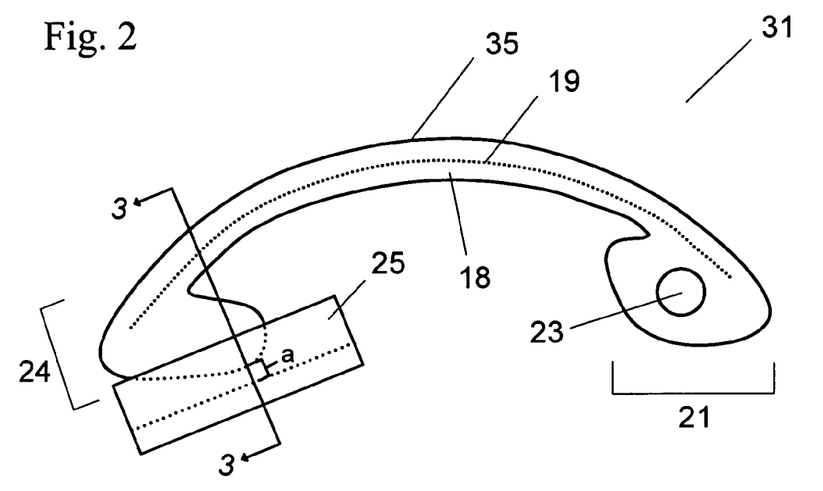
FIG. 2 shows a blade tensioner of the present invention in a minimal load state.
Figure 3A:
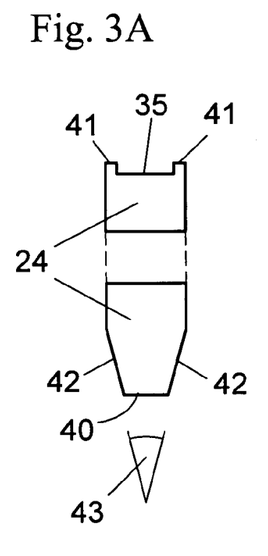
FIG. 3A shows a cross section of the distal end of the blade tensioner of FIG. 2 along line 3-3.
Figure 3B:
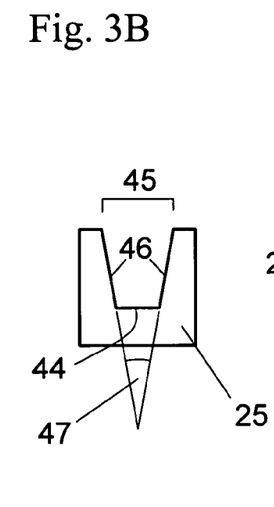
FIG. 3B shows a cross section of the stationary mating block of FIG. 2 along line 3-3.
Figure 3C:
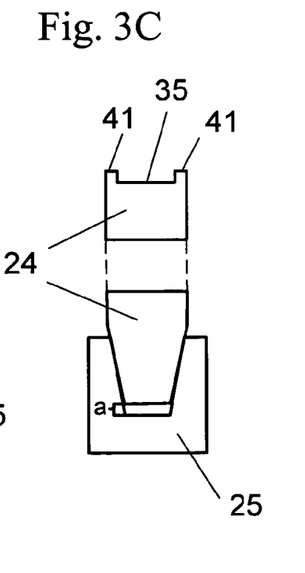
FIG. 3C shows a cross section of FIG. 2 along line 3-3.

FIGS. 2 through 3C show the blade tensioner 31 under minimal load conditions. The chain and sprockets have been omitted for simplicity. In FIG. 2, the distal end portion 24 of the blade shoe is a distance a, from the bottom 44 of the V-shaped channel of the mating block 25 under minimal chain load conditions. FIG. 3A shows a cross-section of the V-shaped portion of the distal end 24 of the blade shoe 18. The "V" of the distal end portion 24 is comprised of a pair of lateral sides 42 that are straight and then taper inward towards the center of the shoe 18 at a distal end angle 43. The distal end angle is preferably not greater than 30 degrees.

FIG. 3B shoes a cross-section of the corresponding V-shaped stationary mating block 25. The mating block 25 has a corresponding "V" shaped channel 45 for receiving the V-shaped distal end portion 24 of the blade shoe 18. The sides of the channel 46 are straight and taper inward towards the center of the mating block 25 at a mating angle 47. The mating angle 47 is preferably not greater than 30 degrees. The channel 45 is preferably designed to dampen chain motion in response to chain normal forces but to allow the V-shaped distal end portion 24 of the blade shoe 18 to be self-releasing and consequently remain in constant contact with the chain during slack chain conditions. The mating angle and the distal end angle are approximately equal.

FIG. 3C shows the mating or wedging of the V-shaped distal end portion 24 of the blade shoe 18 with the stationary mating block 25 under minimal chain load conditions. When the load on the blade shoe 18 is minimal, the proximal end 21 of the blade shoe 18 pivots, so that the straight lateral sides 42 of the V-shaped distal end portion 24 makes contact with corresponding sides 46 of the channel 45. The bottom 40 of the distal end portion 24 of the blade shoe 18 does not contact the bottom 44 of the mating block 25. The wedging or mating of the V-shaped distal end portion 24 of the blade shoe with the stationary mating block 25 dampens the chain vibrations. The degree of damping may be varied by varying the distal end angle 43 and the mating angle 47. As the mating angle 47 gets smaller, the wedging of the blade shoe 18 increases and damping increases. However, too small of a mating angle may lead to permanent blade shoe 18 wedging and an inoperable, "stuck" blade tensioner.

Damping may also be tuned with adjustments to the coefficient of friction at the sliding surface. Friction tuning adjustments may be made by, but are not limited to, incorporating friction materials such as paper or sintered coatings at the sliding interface, grooves to wipe away oil, and surface roughness treatments. All of these adjustments may be made to either the shoe or the mating block.

Figure 4:
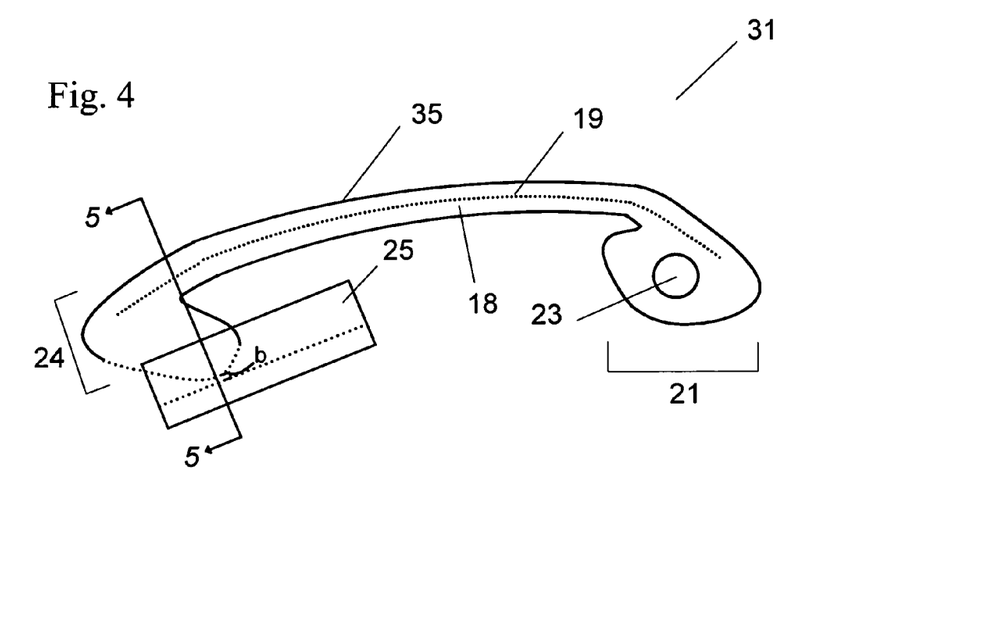
FIG. 4 shows a blade tensioner of the present invention in a high-load state.
Figure 5:
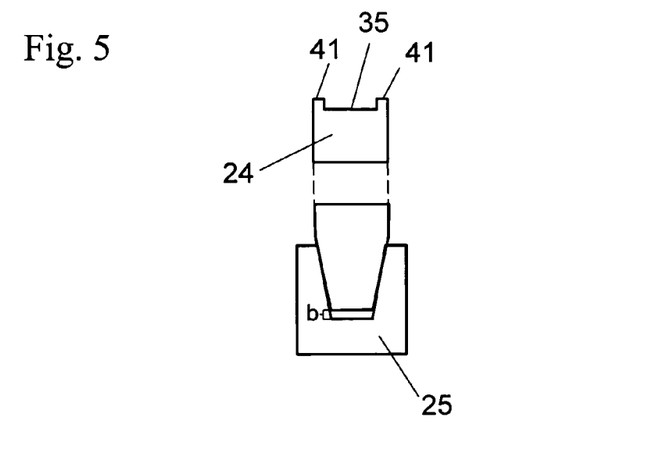
FIG. 5 shows a cross section of FIG. 4 along line 5-5.

FIGS. 4 and 5 show the blade tensioner 31 under high chain load conditions. The chain and sprockets have been omitted for simplicity. FIG. 4 shows the blade shoe 31 slightly flattened in response to the higher chain load, causing the distal end portion 24 of the blade shoe 31 to rotate and translate, such that the distal end portion of the blade shoe is a distance b, from the bottom 44 of the V-shaped channel 45 of the mating block 25 under high chain load conditions. The distance b, between the distal end portion 24 of the blade shoe and the bottom 44 of the V-shaped channel 45 of the mating block 25 during high chain load conditions is less than the distance a, between the distal end portion 24 of the blade shoe and the bottom 44 of the V-shaped channel of the mating block 25 under minimal chain load conditions. The difference between distance a and distance b has been exaggerated in the figures.

FIG. 5 shows a cross-section of the V-shaped portion of the distal end 24 of the blade shoe 18. When the load on the blade shoe 18 is high or at a maximum, the proximal end 21 of the blade shoe 18 pivots, so that the lateral sides 42 of the V-shaped distal end portion 24 are wedged and fully contact the length of the straight or planar sides 46 of the channel 45 of the mating block 25. As the distal end portion 24 wedges further into the channel 45 of the stationary mating block 25, resistance to even further wedging increases. However, the bottom 40 of the V-shaped distal end portion 24 of the blade shoe does not touch the bottom 44 of the V-shaped channel 45 of the stationary mating block 25. The mating block sides 46 cause slight elastic compression and deformation of the distal end portion 24 during wedging. The wedging of the distal end portion 24 of the blade shoe 18 with the stationary mating block 25 dampens chain vibrations by resisting oscillation forces in both directions.

Damping may also be tuned with adjustments to the coefficient of friction at the sliding surface. Friction tuning adjustments may be made by, but are not limited to, incorporating friction materials such as paper or sintered coatings at the sliding interface, grooves to wipe away oil, and surface roughness treatments. All of these adjustments may be made to either the shoe or the mating block.

Figure 6A:
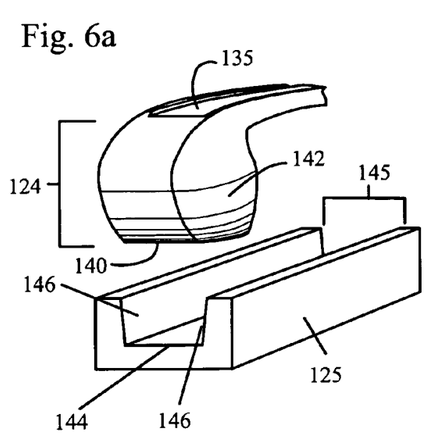
FIG. 6*a* shows a blade tensioner of a second embodiment.
Figure 6B:
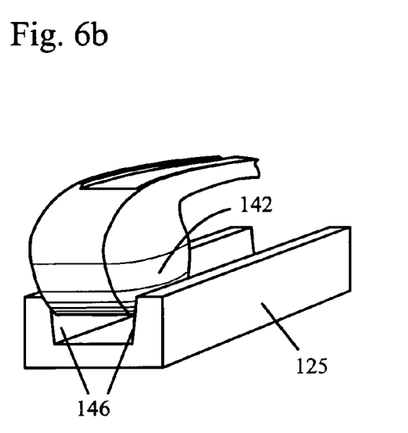
FIG. 6*b* shows wedging of the blade shoe with the mating block.

FIGS. 6a and 6b show a blade tensioner of a second embodiment. FIG. 6a shows the distal end portion 124 of the blade shoe with convexly curved or rounded sides 142 separate from the V-shaped channel 145 of the stationary mating block 125, formed by straight sides 146 joined by a bottom 144. The distal end portion 124 of the blade shoe is preferably V-shaped and tapers away from the chain-sliding surface 135 at an angle. The "V" of the distal end portion 124 is comprised of a pair of sides 142 that are convexly curved or rounded and then taper inward towards the center of the shoe at an angle. The entire blade shoe is not shown.

FIG. 6b shows the distal end portion 124 with the curved sides 142 contacting and wedging with the straight sides 146 of the V-shaped channel 145 of the mating block 125. Similar to the first embodiment, under minimal chain load conditions, the distal end portion 124 of the blade shoe wedges with the stationary mating block 125 and the bottom 140 of the distal end portion 124 of the blade shoe is a first distance (not shown) from the bottom 144 of the V-shaped channel 145 in the stationary mating block 125. As the chain load increases, the distal end portion 124 of the blade shoe rotates and translates, similar to FIG. 4, and the distance between the bottom 140 of the distal end portion 124 of the blade shoe and the bottom 144 of the V-shaped channel 145 in the stationary mating block 125 decreases (not shown). The wedging or mating of the V-shaped distal end portion 124 of the blade shoe with the stationary mating block 125 dampens the chain vibrations.

Damping may also be tuned with adjustments to the coefficient of friction at the sliding surface. Friction tuning adjustments may be made by, but are not limited to, incorporating friction materials such as paper or sintered coatings at the sliding interface, grooves to wipe away oil, and surface roughness treatments. All of these adjustments may be made to either the shoe or the mating block.

Figure 7A:
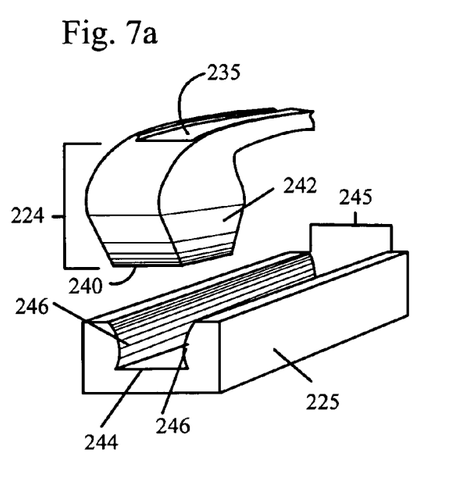
FIG. 7*a* shows a blade tensioner of a third embodiment.
Figure 7B:
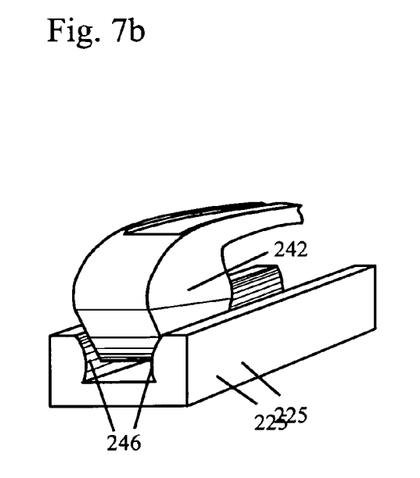
FIG. 7*b* shows wedging of the blade shoe with the mating block.

FIGS. 7a and 7b show a blade tensioner of a third embodiment. FIG. 7a shows the distal end portion 224 of the blade show with straight or planar sides 242 separate from the V-shaped channel 245 of the stationery mating block 225, formed by convexly curved sides 246 joined by a bottom 244. The distal end portion 224 of the blade shoe is preferably V-shaped and tapers away from the chain-sliding surface 235 at an angle. The "V" of the distal end portion 224 is comprised of a pair of lateral sides 242 that are straight or planar and then taper inward towards the center of the shoe at an angle. The entire blade shoe is not shown.

FIG. 7b shows the distal end portion 224 with the straight sides 242 contacting and wedging with the convexly curved sides 246 of the V-shaped channel 245 of the mating block 225. Similar to the first embodiment, under minimal chain load conditions, the distal end portion 224 of the blade shoe wedges with the stationary mating block 225 and the bottom 240 of the distal end portion 224 of the blade shoe is a first distance from the bottom 244 of the V-shaped channel 245 in the stationary mating block 225. As the chain load increases, the distal end portion 224 of the blade shoe rotates and translates, similar to FIG. 4, and the distance between the bottom 240 of the distal end portion 224 of the blade shoe and the bottom 244 of the V-shaped channel 245 in the stationary mating block 225 decreases (not shown). The wedging or mating of the V-shaped distal end portion 224 of the blade show with stationary mating block 225 dampens the chain vibrations.

Damping may also be tuned with adjustments to the coefficient of friction at the sliding surface. Friction tuning adjustments may be made by, but are not limited to, incorporating friction materials such as paper or sintered coatings at the sliding interface, grooves to wipe away oil, and surface roughness treatments. All of these adjustments may be made to either the shoe or the mating block.

Figure 8A:
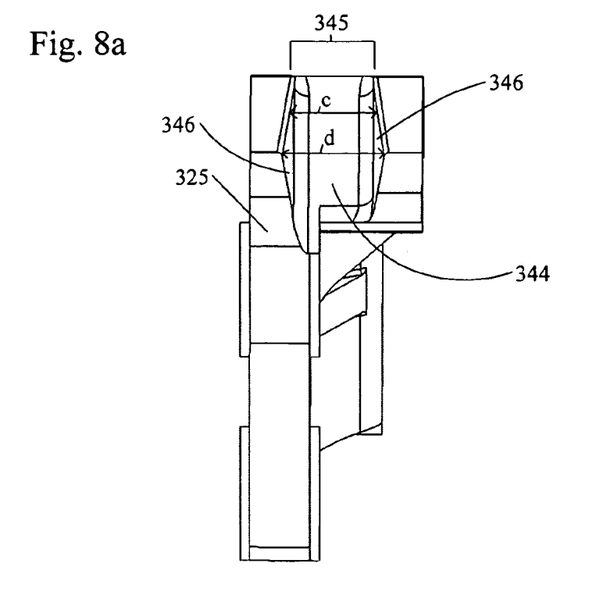
FIG. 8a shows a top down view of the mating block of the blade tensioner of a fourth embodiment.

FIG. 8a shows a top down view of the mating block 325 of the blade tensioner of a fourth embodiment. The mating block 325 has a V-shaped channel 345 that is made of sides 346 that are angled relative to the bottom 344 of the channel 345 such that the channel 345 has a middle or at least a portion of the channel 345 that is a greater distance or width across than the rest of the channel 345. The angle between the sides 346 and the bottom 344 of the channel may be compound. As shown in FIG. 8a, the channel 345 is made up of two widths or distances, c and d. Distance c is less than distance d. By making the channel have a smaller width and a larger width, the point at which the distal end portion 324 of the blade shoe wedges with the channel 345 may be controlled and set.

Figure 8B:
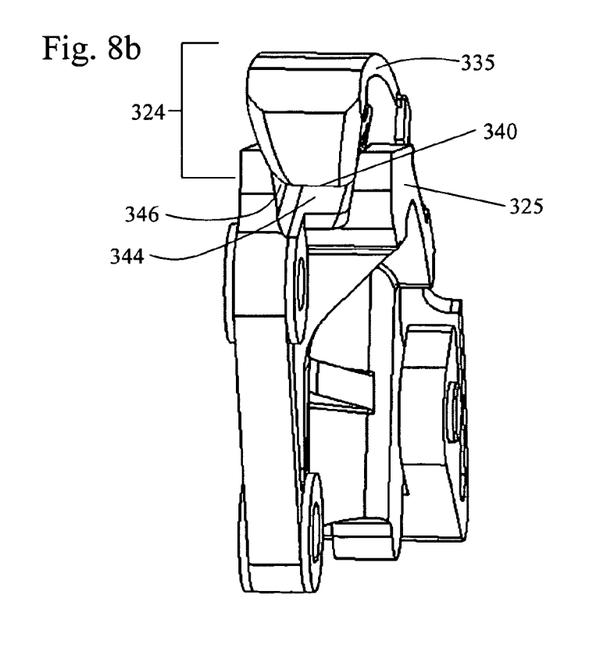
FIG. 8b shows wedging of the blade shoe with the mating block.

FIG. 8b shows the distal end portion 324 of the blade shoe wedged within the channel 345 of the stationary mating block 325. The distal end portion 324 of the shoe is preferably V-shaped and tapers away from the chain-sliding surface 335. The "V" of the distal end portion 324 is comprised of a pair of lateral sides 342 that are straight, planar, or convexly curved (not shown) and then taper inwards towards the center of the shoe at an angle. As in the other embodiments, the bottom 340 of the distal end portion 324 of the blade shoe does not contact the bottom 344 of the channel 345 of the stationary mating block 325.

Furthermore, under minimal chain load conditions, the distal end portion 324 of the blade shoe wedges with the stationary mating block 325 and the bottom 340 of the distal end portion 324 of the blade shoe is a first distance (not shown) from the bottom 344 of the V-shaped channel 345 in the stationary mating block 325. As the chain load increases, the distal end portion 324 of the blade shoe rotates and translates. Due to the compound angle of the tapered sides 346 of the channel 345 of the stationary mating block 325, the distal end portion 324 of the blade shoe rises or moves away from the bottom 344 of the channel 345, increasing the distance between the bottom 340 of the distal end portion 324 of the blade shoe and the channel 345, such that the arcuately curved chain sliding surface 335 comes into an increased amount of contact with the chain, damping chain vibration.

Damping may also be tuned with adjustments to the coefficient of friction at the sliding surface. Friction tuning adjustments may be made by, but are not limited to, incorporating friction materials such as paper or sintered coatings at the sliding interface, grooves to wipe away oil, and surface roughness treatments. All of these adjustments may be made to either the shoe or the mating block.

The embodiments described herein preferably incorporate an aluminum die cast bracket with a steel pivot pin. Alternatively, the bracket may be made from other materials with sufficient structural and wear integrity such as stamped steel or glass-filled nylon molded with a metal V-slide mating block insert. In another embodiment, the bracket may be eliminated altogether with the pivot pin and the stationary V-shaped channel surface located directly on the engine. The mating block and/or the sliding surfaces of the mating block may also be made of aluminum or stamped steel. The pivot pin may be replaced with alternate pivot joint geometries such as, but not limited to, cylindrical pockets or ball joints.

Other shapes and combinations of shapes with opposing geometries may also be used to provide wedging.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A blade tensioner system for a chain, the system including a blade tensioner imparting tension to the chain that drivingly connects a driven shaft to a drive shaft in an engine, the blade tensioner comprising:
    a blade shoe having an arcuately curved chain sliding face, a proximal end portion, and a distal end portion having a pair of substantially planar tapered sides tapering inwards towards a center of the shoe joined by a bottom and arranged at an acute distal end angle; and
    a mating block having a channel with a pair of tapered sides joined by a bottom, for receiving the distal end portion; the sides being inclined such that the sides if extended beyond the bottom would meet at a second acute angle;
    wherein there is a distance between the distal end of the blade shoe and the bottom of the channel of the mating block such that when load on the chain increases, the tapered sides of the distal end portion contact and wedge with the tapered sides of the channel of the mating block, damping chain vibration and wherein when the distal end portion is further received by the channel of the mating block, resistance to further wedging is increased.

2. The blade tensioner of claim 1, wherein the second acute angle is less than 30 degrees.

3. The blade tensioner of claim 1, wherein the distal end angle is less than 30 degrees.

4. The blade tensioner of claim 1, wherein the distal end angle is approximately equal to the second angle.

5. The blade tensioner of claim 1, wherein at least one of the tapered sides of the distal end portion is modified by a surface treatment selected from the group consisting of:
    a) paper-coating;
    b) sinter-coating;
    c) grooving; and
    d) surface roughening.

6. The blade tensioner of claim 1, wherein at least one of the tapered sides of the mating block is modified by a surface treatment selected from the group consisting of:
    a) paper-coating;
    b) sinter-coating;
    c) grooving; and
    d) surface roughening.

7. The blade tensioner of claim 1, wherein the distal end portion is V-shaped.

8. The blade tensioner of claim 1, wherein the channel of the mating block is V-shaped.

9. The blade tensioner of claim 1, wherein the pair of tapered sides of the channel are planar or straight.

10. The blade tensioner of claim 1, wherein the pair of tapered sides of the channel are convexly curved.

11. The blade tensioner of claim 1, wherein the pair of tapered sides of the distal end portion are planar and the pair of tapered sides of the channel are planar.

12. The blade tensioner of claim 1, wherein the pair of tapered sides of the distal end portion are planar and the pair of tapered sides of the channel are convexly curved.

13. The blade tensioner of claim 1, wherein the tapered sides of the channel are arranged relative to the bottom by compound angle.

14. The blade tensioner of claim 1, wherein the bottom of the distal end portion does not mate with the bottom of the channel of the mating block.

15. A method of damping chain vibrations during tensioning of a chain comprising the steps of:
    a) providing a blade tensioner comprising a blade shoe having an arcuately curved chain sliding face, a proximal end portion, and a distal end portion having a pair of substantially planar tapered sides tapering inwards towards a center of the shoe joined by a bottom and arranged at an acute distal end angle;
    b) providing a mating block stationary with respect to the chain comprising a mating block having a channel with a pair of tapered sides joined by a bottom, the sides being inclined such that the sides if extended beyond the bottom would meet at a second acute angle for receiving the distal end portion; and
    c) arranging the blade tensioner and the mating block so that there is a distance between the distal end of the blade shoe and the bottom of the channel of the mating block such that when load on the chain increases, the tapered sides of the distal end portion contact and wedge with the tapered sides of the channel of the mating block, damping chain vibrations and wherein when the distal end portion is further received by the channel of the mating block, resistance to further wedging is increased.

16. The method of claim 15, wherein the second acute angle is less than 30 degrees.

17. The method of claim 15, wherein the distal end angle is less than 30 degrees.

18. The method of claim 15, wherein the distal end angle is approximately equal to the second angle.

19. The method of claim 15, wherein at least one of the tapered sides of the distal end portion is modified by a surface treatment selected from the group consisting of:
    a) paper-coating;
    b) sinter-coating;
    c) grooving; and
    d) surface roughening.

20. The method of claim 15, wherein at least one of the tapered sides of the mating block is modified by a surface treatment selected from the group consisting of:
    a) paper-coating;
    b) sinter-coating;
    c) grooving; and
    d) surface roughening.

21. The method of claim 15, wherein the wherein the distal end portion is V-shaped.

22. The method of claim 15, wherein the channel of the mating block is V-shaped.

23. The blade tensioner of claim 15, wherein the pair of tapered sides of the distal end portion are convexly curved.

24. The blade tensioner of claim 15, wherein the pair of tapered sides of the channel are planar or straight.

25. The blade tensioner of claim 15, wherein the pair of tapered sides of the channel are convexly curved.

26. The blade tensioner of claim 15, wherein the pair of tapered sides of the distal end portion are planar and the pair of tapered sides of the channel are planar.

27. The blade tensioner of claim 15, wherein the pair of tapered sides of the distal end portion are planar and the pair of tapered sides of the channel are convexly curved.

28. The blade tensioner of claim 15, wherein the bottom of the distal end portion does not mate with the bottom of the channel of the mating block.

29. A blade tensioner system for a chain, the system including a blade tensioner imparting tension to the chain that drivingly connects a driven shaft to a driving shaft in an engine, the blade tensioner comprising:
- a blade shoe having an arcuately curved chain sliding face, a proximal end portion, and a distal end portion having a pair of tapered sides joined by a bottom and arranged at a distal end angle; and
- a mating block having a channel with a pair of tapered sides, each tapered side spaced apart a first distance and a second distance from the other tapered side, the pair of tapered sides joined by a bottom and arranged at a compound angle having at least one acute angle for receiving the distal end portion, wherein the first distance is less than the second distance;
- wherein there is a distance between the distal end of the blade shoe and the bottom of the channel of the mating block such that when load on the chain increases, the tapered sides of the distal end portion contact and wedge with the tapered sides of the channel of the mating block and the distal end portion of the blade shoe rises from the channel, such that the arcuately curved chain sliding face comes into increased contact with the chain, damping chain vibration and wherein when the distal end portion is further received by the channel of the mating block, resistance to further wedging is increased.

30. The blade tensioner of claim 29, wherein the pair of tapered sides of the distal end portion are planar and the pair of tapered sides of the channel are planar.

31. The blade tensioner of claim 29, wherein the pair of tapered sides of the distal end portion are planar and the pair of tapered sides of the channel are convexly curved.

32. The blade tensioner of claim 29, wherein the pair of tapered sides of the distal end portion are convexly curved and the pair of tapered sides of the channel are planar.

* * * * *